US007168489B2

(12) United States Patent
Frost et al.

(10) Patent No.: US 7,168,489 B2
(45) Date of Patent: Jan. 30, 2007

(54) ORTHOESTER COMPOSITIONS AND METHODS FOR REDUCING THE VISCOSIFIED TREATMENT FLUIDS

(75) Inventors: Keith A. Frost, Duncan, OK (US); Gary P. Funkhouser, Duncan, OK (US); Brad L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 294 days.

(21) Appl. No.: 10/785,300

(22) Filed: Feb. 24, 2004

(65) Prior Publication Data

US 2005/0045328 A1 Mar. 3, 2005

Related U.S. Application Data

(60) Continuation-in-part of application No. 10/752,752, filed on Jan. 7, 2004, which is a continuation-in-part of application No. 10/650,101, filed on Aug. 26, 2003, and a continuation-in-part of application No. 10/641,242, filed on Aug. 14, 2003, now Pat. No. 7,080,688, which is a continuation-in-part of application No. 10/254,268, filed on Sep. 25, 2002, which is a division of application No. 09/879,634, filed on Jun. 11, 2001, now Pat. No. 6,488,091.

(51) Int. Cl.
*E21B 43/04* (2006.01)
*E21B 43/25* (2006.01)
*E21B 43/267* (2006.01)

(52) U.S. Cl. .................. 166/278; 166/280.2; 166/300; 166/308.1; 166/308.5; 507/260; 507/267; 507/269; 507/277; 507/906; 507/921; 507/924

(58) Field of Classification Search ............... 166/278, 166/280.2, 300, 308.1, 308.2, 308.5; 507/260, 507/267, 269, 277, 906, 921, 924; 428/403, 428/404, 406

See application file for complete search history.

(56) References Cited

U.S. PATENT DOCUMENTS

| | | | | |
|---|---|---|---|---|
| 2,238,671 A | | 4/1941 | Woodhouse | 166/21 |
| 2,485,099 A | * | 10/1949 | Kharasch | 560/192 |
| 2,703,316 A | | 3/1955 | Palmer | 260/78.3 |
| 3,173,484 A | | 3/1965 | Huitt et al. | 166/280.1 |
| 3,195,635 A | | 7/1965 | Fast | 166/280.1 |
| 3,272,650 A | | 9/1966 | MacVittie | 134/7 |
| 3,302,719 A | | 2/1967 | Fischer | 166/280.2 |
| 3,364,995 A | | 1/1968 | Atkins et al. | 166/280.1 |
| 3,366,178 A | | 1/1968 | Malone et al. | 166/280.1 |
| 3,455,390 A | | 7/1969 | Gallus | 166/295 |
| 3,784,585 A | | 1/1974 | Schmitt et al. | 260/861 |
| 3,819,525 A | | 6/1974 | Hattenbrun | 252/132 |
| 3,828,854 A | | 8/1974 | Templeton et al. | 166/307 |
| 3,868,998 A | | 3/1975 | Lybarger et al. | 166/278 |
| 3,912,692 A | | 10/1975 | Casey et al. | 260/78.3 |
| 3,948,672 A | | 4/1976 | Harnsberger | 106/90 |
| 3,955,993 A | | 5/1976 | Curtice et al. | 106/90 |
| 3,960,736 A | | 6/1976 | Free et al. | 252/8.55 R |
| 3,968,840 A | | 7/1976 | Tate | 166/280.1 |
| 3,998,272 A | | 12/1976 | Maly | 166/281 |
| 3,998,744 A | | 12/1976 | Arnold et al. | 507/269 |
| 4,068,718 A | | 1/1978 | Cooke, Jr. et al. | 166/280.2 |
| 4,169,798 A | | 10/1979 | DeMartino | 252/8.55 R |
| 4,172,066 A | | 10/1979 | Zweigle et al. | 260/29.6 TA |
| 4,261,421 A | | 4/1981 | Watanabe | 166/281 |
| 4,387,769 A | | 6/1983 | Erbstoesser et al. | 166/295 |
| 4,390,417 A | * | 6/1983 | Sweeney | 208/188 |
| 4,460,052 A | | 7/1984 | Gockel | 175/72 |
| 4,470,915 A | | 9/1984 | Conway | 252/8.55 R |
| 4,498,995 A | | 2/1985 | Gockel | 252/8.5 LC |
| 4,526,695 A | | 7/1985 | Erbstoesser et al. | 252/8.55 R |
| 4,694,905 A | | 9/1987 | Armbruster | 166/280 |
| 4,715,967 A | | 12/1987 | Bellis | 252/8.551 |
| 4,716,964 A | | 1/1988 | Erbstoesser et al. | 166/284 |
| 4,785,884 A | | 11/1988 | Armbruster | 166/280 |
| 4,797,262 A | | 1/1989 | Dewitz | 422/142 |

(Continued)

FOREIGN PATENT DOCUMENTS

EP  0 510 762 A2  4/1992

(Continued)

OTHER PUBLICATIONS

Cantu, et al., "Laboratory and Field Evaluation of a Combined Fluid-Loss-Control Additive and Gel Breaker for Fracturing Fluids," SPE Paper 18211.

(Continued)

*Primary Examiner*—George Suchfield
(74) *Attorney, Agent, or Firm*—Robert A. Kent; Baker Botts

(57) ABSTRACT

In one embodiment, the present invention provides a method of reducing the viscosity of a viscosified treatment fluid comprising contacting the viscosified treatment fluid with an acid generated from an orthoester composition that comprises an orthoester. In another embodiment, the present invention provides a method of reducing the pH of a viscosified treatment fluid comprising providing an orthoester composition that comprises an orthoester; contacting the viscosified treatment fluid with the orthoester composition; allowing the orthoester to generate a generated acid; and allowing the generated acid to at least partially reduce the pH of the viscosified treatment fluid. Embodiments of fracturing and gravel packing methods also are disclosed.

49 Claims, No Drawings

U.S. PATENT DOCUMENTS

| | | | |
|---|---|---|---|
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadia | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,504,235 A * | 4/1996 | Hirose et al. | 556/467 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/200 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,440,460 B1 * | 8/2002 | Gurny et al. | 424/486 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Crook et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,896,058 B2 | 5/2005 | Munoz, Jr. et al. | 166/279 |
| 6,949,491 B2 | 9/2005 | Cooke, Jr. | 507/219 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2003/0236171 A1 | 12/2003 | Nguyen et al. | 507/100 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0221989 A1 | 11/2004 | Zhou et al. | 166/282 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0103496 A1 | 5/2005 | Todd et al. | 166/278 |
| 2005/0252659 A1 | 11/2005 | Sullivan et al. | 166/280.1 |
| 2005/0272613 A1 | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| WO | WO 93/15127 | 8/1993 |
| WO | WO 94/07949 | 4/1994 |
| WO | WO 94/08078 | 4/1994 |
| WO | WO 94/08090 | 4/1994 |

| | | |
|---|---|---|
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Love, et al, *Selectively Placing Many Fractures in Openhole Horizontal Wells Improves Production*, SPE 50422, Society of Petroleum Engineers, 1998.

McDaniel, et al, *Evolving New Stimulation Process Powers Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, SurgiFrac[SM] Service, *A Quick and Cost-Effective Method to Help Boost Production From Openhole Horizontal Completions*, Halliburton Communications, HO3297, 2002.

Halliburton, Cobra Frac[SM] Service, *Coiled Tubing Fracturing—Cost-Effective Method for Stimulating Untapped Reserves*, HO2319R, Halliburton Energy Services, 2000.

Halliburton, CobraJet Frac[SM] Service, *Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl .No. 10/864,061, filed Jun. 9, 2004.

Blauch, et al, *Aqueous-Based Tackifier Fluids and Methods of Use*, U.S. Appl. No. 10/864,618, filed Jun. 9, 2004.

U.S. Appl. No. 10/650,101, filed Aug. 26, 2003, Todd et al.
U.S. Appl. No. 10/655,883, filed Sep. 5, 2003, Nguyen.
U.S. Appl. No. 10/661,173, filed Sep. 11, 2003 Todd et al.
U.S. Appl. No. 10/664,126, filed Sep. 17, 2003, Todd et al.
U.S. Appl. No. 10/736,152, filed Dec. 15, 2003, Todd.
U.S. Appl. No. 10/765,334, filed Jan. 27, 2004, Todd et al.
U.S. Appl. No. 10/768,323, filed Jan. 30, 2004, Roddy et al.
U.S. Appl. No. 10/768,864, filed Jan. 30, 2004, Roddy et al.
U.S. Appl. No. 10/769,490, filed Jan. 30, 2004, Roddy et al.
U.S. Appl. No. 10/783,207, filed Feb. 20, 2004, Surjaatmadja, et al.

Y. Chiang et al.: "Hydrolysis of Ortho Esters: Further Investigation of the Factors Which Control the Rate-Determining Step,"Engineering Information Inc., NY, NY, vol. 105, No. 23 (XP-002322842).

M. Ahmad, et al.: "Ortho Ester Hydrolysis: Direct Evidence for a Three-Stage Reaction Mechanism," Engineering Information Inc., NY, NY, vol. 101, No. 10 (XP-002322843).

Foreign Search Report and Written Opinion (PCT/GB2005/000397).

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632).

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709.

* cited by examiner

ORTHOESTER COMPOSITIONS AND METHODS FOR REDUCING THE VISCOSIFIED TREATMENT FLUIDS

CROSS-REFERENCE TO RELATED APPLICATIONS

This application is a continuation-in-part of Ser. No. 10/752,752, entitled Orthoester Compositions and Methods of Use in Subterranean Applications, filed on Jan. 7, 2004, which itself is a continuation-in-part of Ser. No. 10/641,242, entitled Cornpositions and Methods for Degrading a Filter Cake, filed on Aug. 14, 2003 now U.S. Pat. No. 7,080,688 and Ser. No. 10/650,101, entitled Compositions and Methods for Reducing the Viscosity of a Fluid, filed on Aug. 26, 2003, which itself is a continuation-in-part of Ser. No. 10/254,268, entitled Subterranean Formation Treating Fluid Concentrates, Treating Fluids and Methods, filed on Sep. 25, 2002, which itself is a divisional of Ser. No. 09/879,634, entitled Subterranean Formation Treating Fluid Concentrates, Treating Fluids and Methods, filed on Jun. 11, 2001, which issued on Dec. 3, 2002 as U.S. Pat. No. 6,488,091.

BACKGROUND OF THE INVENTION

The present invention relates to methods and compositions for treating subterranean well formations, and more specifically, to improved orthoester compositions comprising orthoesters and methods for reducing the viscosity of viscosified treatment fluids.

A variety of viscosified treatment fluids are used in subterranean applications, such as drilling fluids, fracturing fluids, and gravel pack fluids. Oftentimes, after the viscosified fluid has performed its desired task, it may be desirable to reduce its viscosity so that the treatment fluid can be recovered from the formation and/or particulate matter may be dropped out of the treatment fluid at a desired location within the formation. Reducing the viscosity of a viscosified treatment fluid is often referred to as "breaking" the fluid.

Well stimulation treatments, such as fracturing treatments, commonly employ viscosified treatment fluids. Fracturing generally involves pumping a viscous fracturing fluid into a subterranean formation with sufficient hydraulic pressure to create one or more cracks or "fractures." The fracturing fluid generally has a viscosity that is sufficient to suspend proppant particles and to place the proppant particles in fractures, inter alia, to maintain the integrity of those fractures once the hydraulic pressure is released. Once at least one fracture is created and the proppant is substantially in place, the viscosity of the fracturing fluid usually is reduced, and the fluid is recovered from the formation.

Similarly, sand control operations, such as gravel packing, use viscosified treatment fluids, often referred to as gravel pack fluids. Gravel pack fluids usually are used to suspend gravel particles for delivery to a desired area in a well bore, e.g., near unconsolidated or weakly consolidated formation particulates. One common type of gravel packing operation involves placing a gravel pack screen in the well bore and packing the annulus between the screen and the well bore with gravel of a specific size designed to prevent the passage of formation sand. When installing the gravel pack, oftentimes the gravel is carried to the formation in the form of a slurry by mixing the gravel with a transport fluid. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered from the well bore.

For some viscosified treatment fluids their viscosity may be related to pH. Thus, viscosity-reducing agents that reduce the pH of the treatment fluid may be added to reduce the viscosity of the fluid. Internal breakers, such as enzymes, oxidizers, acids, or temperature-activated viscosity reducers, also are used to reduce the viscosity of viscosified treatment fluids. Unfortunately, these traditional breakers may result in an incomplete or premature viscosity reduction. Premature viscosity reduction is undesirable as it may lead to, inter alia, the particulates settling out of the fluid in an undesirable location and/or at an undesirable time. Moreover, conventional non-delayed breakers begin to reduce the viscosity of the viscosified fluid upon addition and continue to reduce the fluid's viscosity with time until the fluid is completely broken or until the breaker is expended. Since the breaking activity begins immediately, it is common practice to start with excess viscosifier to offset the point at which the viscosity falls below an acceptable level. Using excess viscosifier is not only an added expense, it also may lead to excessive friction pressure during treatment placement.

As an alternative to using traditional breakers, breaking a viscosified treatment fluid also may be accomplished using just time and/or temperature. The viscosity of most treatment fluids will reduce naturally if given enough time and at a sufficient temperature. However, such methods generally are not practical as it is highly desirable to return the well back to production as quickly as possible as opposed to waiting for the viscosity of a treatment fluid to naturally decrease over time.

SUMMARY OF THE INVENTION

The present invention relates to methods and compositions for treating subterranean well formations, and more specifically, to improved orthoester compositions comprising orthoesters and methods for reducing the viscosity of viscosified treatment fluids.

In one embodiment, the present invention provides a method of reducing the viscosity of a viscosified treatment fluid comprising contacting the viscosified treatment fluid with an acid generated from an orthoester composition that comprises an orthoester.

In another embodiment, the present invention provides a method of reducing the pH of a viscosified treatment fluid comprising providing an orthoester composition that comprises an orthoester; contacting the viscosified treatment fluid with the orthoester composition; allowing the orthoester to generate a generated acid; and allowing the generated acid to at least partially reduce the pH of the viscosified treatment fluid.

In another embodiment, the present invention provides a method of fracturing a subterranean formation comprising contacting the subterranean formation with a fracturing fluid at a pressure sufficient to create or enhance at least one fracture in the subterranean formation; contacting the fracturing fluid with an orthoester composition comprising an orthoester; allowing the orthoester to generate a generated acid; allowing the viscosity of the fracturing fluid to decrease; and removing at least a portion of the fracturing fluid from the subterranean formation.

In another embodiment, the present invention provides a method of creating a gravel pack in a well bore comprising placing a gravel pack fluid comprising gravel particulates into a portion of the well bore so as to create a gravel pack;

contacting the gravel pack fluid with an orthoester composition comprising an orthoester; allowing the orthoester to generate a generated acid; allowing the viscosity of the gravel pack fluid to decrease; and removing at least a portion of the gravel pack fluid from the subterranean formation.

In another embodiment, the present invention provides a composition comprising an orthoester that will generate an acid that is capable of at least partially reducing the viscosity of a viscosified treatment fluid.

The features and advantages of the present invention will be readily apparent to those skilled in the art upon a reading of the description of the preferred embodiments, which follows.

DESCRIPTION OF PREFERRED EMBODIMENTS

The present invention relates to methods and compositions for treating subterranean well formations, and more specifically, to improved orthoester compositions comprising orthoesters and methods for reducing the viscosity of viscosified treatment fluids. One of the desirable features of the compositions and methods of the present invention is that they provide for the delayed release of an acid and a subsequent efficient break of a viscosified treatment fluid in a desirable amount of time. The compositions and methods of the present invention are suitable for any application wherein the viscosity of a viscosified treatment fluid may be reduced by the use of an acid.

The orthoester compositions of the present invention comprise orthoesters. These orthoesters will generate acids that may reduce the viscosity of a viscosified treatment fluid. Examples of suitable orthoesters have a structure defined by the formula: $RC(OR')(OR'')(OR''')$, wherein $R'$, $R''$, and $R'''$ are not hydrogen, and $R'$, $R''$, and $R'''$ may or may not be the same group. $R'$, $R''$, or $R'''$ may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates). Suitable orthoesters also may include orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors. The orthoester may comprise less than about 1% to about 100% of the orthoester composition.

To allow the orthoester to hydrolyze to produce an acid, a source of water is needed. The water should be present in an amount from about 2 moles of water for about every 1 mole of orthoester to an excess of water. One of ordinary skill in the art with the benefit of this disclosure will recognize whether a suitable amount of water is present in either the orthoester composition or otherwise in the well bore for a desired application.

The orthoester compositions of the present invention also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions of the present invention can have any suitable form. For instance, these compositions can be used in a solution form, a gel form, or an emulsion form. In certain applications, a solution form may be useful, e.g., when a faster break of a treatment fluid, is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

In the certain embodiments of the methods of the present invention, an orthoester composition of the present invention is added to a viscosified treatment fluid to reduce its pH so as to eventually at least partially reduce its viscosity. Depending on the timing required for the reduction of viscosity, the orthoester composition may provide a relatively fast break or a relatively slow break, depending on, for example, the particular orthoester chosen and the form in which the orthoester composition is provided. In some embodiments, the orthoester composition may act at a delayed rate to produce an acid that may cause a relatively controlled or delayed reduction of the viscosity of the treatment fluid. In choosing the appropriate orthoester, one should also consider the acid that will be produced in the context of the viscosified treatment fluid. Among other things, the acid should not adversely affect other operations or components. One of ordinary skill in the art with the benefit of this disclosure will be able to select a suitable orthoester and a suitable orthoester composition to accomplish the break in a desired period of time.

Any viscosified treatment fluid that experiences a reduction in viscosity when its pH is lowered is suitable for use in the methods of the present invention. These may include, but are not limited to, aqueous gels and emulsions. Suitable aqueous gels are generally comprised of water and one or more gelling agents, while suitable emulsions are generally comprised of an aqueous phase (e.g., water or a brine) and a nonaqueous phase (e.g., a hydrocarbon). Viscosified treatment fluids that are suitable for use in conjunction with the orthoester compositions of the present invention may comprise a variety of gelling agents, including hydratable polymers that contain one or more functional groups such as hydroxyl, cis-hydroxyl, carboxyl, sulfate, sulfonate, amino, or amide. Polysaccharides and derivatives thereof that comprise groups such as galactose, mannose, glucoside, glucose, xylose, arabinose, fructose, glucuronic acid, or pyranosyl sulfate, may be beneficially used in conjunction with the compositions and methods of the present invention. Hydratable synthetic polymers and copolymers that contain the above-mentioned functional groups also may be used. Examples of such synthetic polymers include, but are not limited to, polyacrylate, polymethacrylate, polyacrylamide, polyvinyl alcohol, and polyvinylpyrrolidone. Copolymers of these polymers also may be suitable. The viscosifying agent used is generally combined with the water in a viscosified treatment fluid in an amount in the range of from about 0.01% to about 2% by weight of the water. The gelling agents may be crosslinked with suitable crosslinking agents that may be used to further increase the viscosity of the treatment fluid. Examples of such crosslinking agents include, but are not limited to, alkali metal borates, borax, boric acid, and compounds that are capable of releasing multivalent metal ions in aqueous solutions. Examples of suitable multivalent metal ions are chromium, zirconium, antimony, titanium, iron, zinc or aluminum. When used, the cross-linking agent is generally added to the gelled water in an amount in the range of from about 0.01% to about 5% by weight of the water.

In alternative embodiments of the methods of the present invention, an orthoester composition of the present invention may be coated or impregnated onto particulates that will be placed downhole in a subterranean treatment such as fracturing or gravel packing. When the orthoester ultimately hydrolyzes and generates the acid, the acid may act to reduce the pH of the viscosified treatment fluid to at least partially reduce the viscosity of the treatment fluid.

Any particulate suitable for use in conjunction with subterranean applications is suitable for use as particulates in these embodiments of the methods of the present invention. For instance, natural sand, quartz sand, particulate garnet, glass, ground walnut hulls, polymeric pellets, bauxite, ceramics, or the like are all suitable. Suitable sizes range from about 4 to about 100 U.S. mesh, in certain preferred embodiments, the sizes may range from about 10 to about 70 U.S. mesh.

The orthoester compositions of the present invention may be coated onto a particulate material by any means known in the art. For instance, in one embodiment, the particulates may be coated with an orthoester composition "on-the-fly." The term "on-the-fly" is used herein to refer to an instance where one flowing stream is continuously introduced into another flowing stream so that the streams are combined and mixed while continuing to flow as a single stream as part of an ongoing treatment. Such mixing can also be described as "real-time" mixing. Batch or partial batch mixing processes may also be suitable. The coated particulate as described herein may be used as gravel particles in sand control operations, as proppant particles in fracturing operations, or as any other particulate employed in subterranean operations.

Where the orthoester composition is a relatively solid material at ambient temperatures, it may be advantageous to mix the orthoester composition with a solvent to facilitate the coating of the orthoester composition onto the particulates. A variety of solvents known in the art may be suitable. Some such solvents include, but are not limited to, acetone, propylene carbonate, dipropylene glycol methyl ether, isopropyl alcohol, or combinations thereof.

In some embodiments of the present invention, the particulates are coated with from about 0.1% to about 20% orthoester composition by weight of the particulates, more preferably from about 0.5% to about 10% orthoester composition by weight of the particulates, and most preferably, from about 1% to about 8% orthoester composition by weight of the particulate material.

In some embodiments, 100% of the particulates are coated with an orthoester composition of the present invention; in other embodiments, only a portion of the particulates may be coated. Where less than 100% of the particulates are coated with an orthoester composition of the present invention, it may be desirable to use a higher concentration of an orthoester composition relative to that portion of the particulates to be coated. It is within the ability of one skilled in the art with the benefit of this disclosure to determine the amount of orthoester composition that will be necessary to sufficiently reduce the viscosity of a viscosified treatment fluid and to coat a portion of particulates with enough orthoester composition to achieve that goal.

Where the coated particulates are used in a sand control operation such as gravel packing, the gravel pack may be formed using any technique known in the art. In one technique, gravel particles (at least a portion of which are partially coated with an orthoester composition of the present invention) are slurried into a treatment fluid and pumped into the well bore having a filter cake deposited therein substantially adjacent to the zone of the subterranean formation that has been fitted with a gravel pack screen. In alternative embodiments, it is possible to not use a screen if desired. The gravel particulates are separated from the slurry as the delivery fluid is forced into the well bore through the screen if a screen is used. The gravel particulates are not able to flow through the mesh of the screen and are left behind, forming a gravel pack. The acid generated by the orthoester composition may then act to reduce the pH of the viscosified treatment fluid to at least partially reduce its viscosity.

In one embodiment, the present invention provides a method of reducing the viscosity of the viscosified treatment fluid comprising contacting the viscosified treatment fluid with an acid generated from an orthoester composition that comprises an orthoester.

In another embodiment, the present invention provides a method of reducing the pH of a viscosified treatment fluid comprising providing an orthoester composition that comprises an orthoester; contacting the viscosified treatment fluid with the orthoester composition; allowing the orthoester to generate a generated acid; and allowing the generated acid to at least partially reduce the pH of the viscosified treatment fluid.

In another embodiment, the present invention provides a method of fracturing a subterranean formation comprising contacting the subterranean formation with a fracturing fluid at a pressure sufficient to create or enhance at least one fracture in the subterranean formation; contacting the fracturing fluid with an orthoester composition comprising an orthoester; allowing the orthoester to generate a generated acid; allowing the viscosity of the fracturing fluid to decrease; and removing at least a portion of the fracturing fluid from the subterranean formation.

In another embodiment, the present invention provides a method of creating a gravel pack in a well bore comprising placing a gravel pack fluid comprising gravel particulates into a portion of the well bore so as to create a gravel pack; contacting the gravel pack fluid with an orthoester composition comprising an orthoester; allowing the orthoester to generate a generated acid; allowing the viscosity of the gravel pack fluid to decrease; and removing at least a portion of the gravel pack fluid from the subterranean formation.

In another embodiment, the present invention provides a composition comprising an orthoester that will generate an acid that is capable of at least partially reducing the viscosity of a viscosified treatment fluid.

Although this invention has been described in terms of some specific uses of the orthoester compositions of the present invention, the orthoester compositions may be used in other applications, for example, to degrade other acid-soluble components in a subterranean formation like the formation itself, calcium carbonate, acid-soluble components of completion equipment such as plugs, or resins (e.g., thermosetting resins).

To facilitate a better understanding of the present invention, the following examples of preferred embodiments are given. In no way should the following examples be read to limit or define the scope of the invention.

EXAMPLE

While shearing in a small Waring blender, 0.48 g of guar gum was added to 91 ml of tap water. After hydrating for 20 minutes, 0.12 ml of a borate crosslinker, 0.25 ml of 25% sodium hydroxide, 1 ml of WS-44 emulsifier (available from Halliburton Energy Services, Duncan, Okla.), and 8 ml of tripropyl orthoformate were added in the order listed and sheared until uniformly mixed. Rheology was measured using a Brookfield PVS viscometer fitted with a B5X bob at a constant shear rate of 40 $sec^{-1}$. Viscosity was recorded at 5 minute intervals for the duration of the test. Representative readings are shown in the Table below. After some initial thermal thinning, the viscosity was constant until approximately 9 hours, when the sample lost viscosity rapidly. The pH at the end of the test was 4, compared to 12 when the fluid was first mixed. Once the fluid broke, the torque measurement on the rheometer was below the optimum range for accurate measurements. Although the indicated viscosity is zero, the fluid does have a finite viscosity after breaking.

| Time, min. | Viscosity, cP | Temperature, ° C. |
|---|---|---|
| 5 | 2720 | 76 |
| 30 | 2250 | 84 |
| 60 | 1370 | 84 |
| 120 | 1570 | 84 |
| 180 | 1450 | 84 |
| 240 | 1560 | 84 |
| 300 | 1270 | 84 |
| 360 | 1470 | 84 |
| 420 | 1330 | 84 |
| 480 | 1310 | 84 |
| 540 | 1560 | 84 |
| 555 | 1290 | 84 |
| 560 | 1140 | 84 |
| 565 | 1130 | 84 |
| 570 | 1020 | 84 |
| 575 | 808 | 84 |
| 580 | 625 | 84 |
| 585 | 315 | 84 |
| 590 | 0 | 84 |
| 595 | 0 | 84 |
| 600 | 0 | 84 |
| 605 | 0 | 84 |

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of reducing the viscosity of a viscosified treatment fluid comprising contacting the viscosified treatment fluid in a subterranean formation with an acid generated from an orthoester composition that comprises an orthoester.

2. The method of claim 1 wherein the orthoester has the general formula RC(OR')(OR")(OR'"), wherein R', R", and R'" are not hydrogen, and R', R", and R'" may or may not be the same group.

3. The method of claim 2 wherein R', R", or R'" comprise a heteroatom.

4. The method of claim 3 wherein the heteroatom is nitrogen or oxygen.

5. The method of claim 1 wherein the orthoester is selected from the group consisting of orthoacetates, orthoformates, orthopropionates, and combinations thereof.

6. The method of claim 1 wherein the orthoester comprises an orthoester of a polyfunctional alcohol.

7. The method of claim 1 wherein the orthoester comprises a poly(orthoester).

8. The method of claim 1 wherein the viscosified treatment fluid is a fracturing fluid or a gravel pack fluid.

9. The method of claim 1 wherein the viscosified treatment fluid comprises a gelling agent that comprises a hydratable polymer.

10. The method of claim 1 wherein the viscosified treatment fluid comprises a crosslinked polysaccharide.

11. The method of claim 1 wherein at least a portion of the orthoester composition is coated or impregnated onto particulates to form coated particulates or impregnated particulates.

12. The method of claim 11 wherein the particulates are selected from the group consisting of natural sand, quartz sand, particulate garnet, glass, ground walnut hulls, polymeric pellet, bauxite, ceramics, and combinations thereof.

13. The method of claim 11 wherein the particulates are in a size range from about 4 to about 100 US mesh.

14. The method of claim 11 wherein the particulates are in a size range from about 10 to about 70 US mesh.

15. The method of claim 11 wherein the orthoester is coated onto the particulates using an on-the-fly method.

16. The method of claim 11 wherein the orthoester is coated onto the particulates in a batch process.

17. The method of claim 1 wherein the orthoester composition comprises water.

18. The method of claim 17 wherein the water is present in an amount from about 2 moles of water for about every 1 mole of orthoester to an excess of water.

19. The method of claim 1 wherein the orthoester composition or the viscosified treatment fluid comprises an inhibitor.

20. The method of claim 1 wherein the orthoester composition is in a solution form, a gel form, or an emulsion form.

21. The method of claim 1 wherein the viscosity of the viscosified treatment fluid is reduced after a desired delay period.

22. A method of reducing the pH of a viscosified treatment fluid comprising:
 providing an orthoester composition that comprises an orthoester;
 contacting the viscosified treatment fluid in a subterranean formation with the orthoester composition;
 allowing the orthoester to generate a generated acid; and
 allowing the generated acid to at least partially reduce the pH of the viscosified treatment fluid.

23. The method of claim 22 wherein the orthoester has the general formula RC(OR')(OR")(OR'"), wherein R', R", and R'" are not hydrogen, and R', R", and R'" may or may not be the same group.

24. The method of claim 23 wherein R', R", or R'" comprise a heteroatom.

25. The method of claim 24 wherein the heteroatom is nitrogen or oxygen.

26. The method of claim 22 wherein the orthoester is selected from the group consisting of orthoacetates, orthoformates, orthopropionates, and combinations thereof.

27. The method of claim 22 wherein the orthoester comprises an orthoester of a polyfunctional alcohol.

28. The method of claim 22 wherein the orthoester comprises a poly(orthoester).

29. The method of claim 22 wherein the viscosified treatment fluid is a fracturing fluid or a gravel pack fluid.

30. The method of claim 22 wherein the viscosified treatment fluid comprises a gelling agent that comprises a hydratable polymer.

31. The method of claim 22 wherein the orthoester composition comprises water.

32. The method of claim 31 wherein the water is present in an amount from about 2 moles of water for about every 1 mole of orthoester to an excess of water.

33. A method of fracturing a subterranean formation comprising:
  contacting the subterranean formation with a fracturing fluid at a pressure sufficient to create or enhance at least one fracture in the subterranean formation;
  contacting the fracturing fluid with an orthoester composition comprising an orthoester;
  allowing the orthoester to generate a generated acid;
  allowing the viscosity of the fracturing fluid to decrease; and
  removing at least a portion of the fracturing fluid from the subterranean formation.

34. The method of claim 33 wherein the orthoester has the general formula RC(OR')(OR")(OR'"), wherein R', R", and R'" are not hydrogen, and R', R", and R'" may or may not be the same group.

35. The method of claim 34 wherein R', R", or R'" comprise a heteroatom.

36. The method of claim 33 wherein the orthoester comprises an orthoester of a polyfunctional alcohol.

37. The method of claim 33 wherein the orthoester composition or the fracturing fluid comprises an inhibitor that is capable of interacting with the generated acid so as to delay the reduction of the viscosity of the fracturing fluid.

38. The method of claim 37 wherein the inhibitor is selected from the group consisting of sodium hydroxide, potassium hydroxide, amines, sodium carbonate, and combinations thereof.

39. The method of claim 33 wherein at least a portion of the orthoester composition is coated or impregnated onto particulates to form coated particulates or impregnated particulates.

40. The method of claim 39 wherein the particulates are selected from the group consisting of natural sand, quartz sand, particulate garnet, glass, ground walnut hulls, polymeric pellet, bauxite, ceramics, and combinations thereof.

41. A method of creating a gravel pack in a well bore comprising:
  placing a gravel pack fluid comprising gravel particulates into a portion of the well bore so as to create a gravel pack;
  contacting the gravel pack fluid with an orthoester composition comprising an orthoester;
  allowing the orthoester to generate a generated acid;
  allowing the viscosity of the gravel pack fluid to decrease; and
  removing at least a portion of the gravel pack fluid from the subterranean formation.

42. The method of claim 41 wherein the orthoester has the general formula RC(OR')(OR")(OR'"), wherein R', R", and R'" are not hydrogen, and R', R", and R'" may or may not be the same group.

43. The method of claim 42 wherein R', R", or R'" comprise a heteroatom.

44. The method of claim 41 wherein the orthoester comprises an orthoester of a polyfunctional alcohol.

45. The method of claim 41 wherein the orthoester composition or the gravel pack fluid comprises an inhibitor that is capable of interacting with the generated acid so as to delay the reduction of the viscosity of the fracturing fluid.

46. The method of claim 45 wherein the inhibitor is selected from the group consisting of sodium hydroxide, potassium hydroxide, amines, sodium carbonate, and combinations thereof.

47. The method of claim 41 wherein at least a portion of the orthoester composition is coated or impregnated onto the gravel particulates to form coated gravel particulates or impregnated gravel particulates.

48. The method of claim 47 wherein the gravel particulates are selected from the group consisting of natural sand, quartz sand, particulate garnet, glass, ground walnut hulls, polymeric pellet, bauxite, ceramics, and combinations thereof.

49. A method of reducing the viscosity of a viscosified treatment fluid comprising contacting the viscosified treatment fluid with an acid generated from an orthoester composition that comprises an orthoester wherein the viscosified treatment fluid comprises a crosslinked polysaccharide.

* * * * *